US010012872B2

(12) United States Patent
Lee et al.

(10) Patent No.: US 10,012,872 B2
(45) Date of Patent: Jul. 3, 2018

(54) DISPLAY DEVICE

(71) Applicant: Samsung Display Co., Ltd., Yongin-si, Gyeonggi-Do (KR)

(72) Inventors: Seungkyu Lee, Cheonan-si (KR); Wan Namgung, Asan-si (KR); Hongmin Yoon, Seoul (KR); Hojun Lee, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/823,646

(22) Filed: Aug. 11, 2015

(65) Prior Publication Data

US 2016/0216569 A1    Jul. 28, 2016

(30) Foreign Application Priority Data

Jan. 28, 2015 (KR) ........................ 10-2015-0013654

(51) Int. Cl.
*G02F 1/1337* (2006.01)
*G02F 1/1343* (2006.01)
*G02F 1/1362* (2006.01)

(52) U.S. Cl.
CPC .. *G02F 1/134309* (2013.01); *G02F 1/133707* (2013.01); *G02F 2001/134345* (2013.01); *G02F 2001/136222* (2013.01)

(58) Field of Classification Search
None
See application file for complete search history.

(56) References Cited

U.S. PATENT DOCUMENTS

| 8,098,358 | B2 | 1/2012 | Kim et al. | |
| 8,259,053 | B2 | 9/2012 | Shin | |
| 8,334,831 | B1 | 12/2012 | Shin | |
| 8,629,950 | B2 | 1/2014 | Kim et al. | |
| 2012/0075562 | A1* | 3/2012 | Yeh | G02F 1/1323 349/139 |
| 2012/0282674 | A1 | 11/2012 | Park et al. | |
| 2013/0027439 | A1* | 1/2013 | Kim | G09G 3/003 345/690 |

(Continued)

FOREIGN PATENT DOCUMENTS

KR    10-2009-0118391 A    11/2009
KR    10-2010-0055696 A    5/2010

(Continued)

*Primary Examiner* — Edward Glick
*Assistant Examiner* — Anthony G Quash
(74) *Attorney, Agent, or Firm* — H.C. Park & Associates, PLC

(57) ABSTRACT

A display device includes a first substrate; a pixel electrode disposed on the first substrate, including at least two sub-pixel electrodes separated from one another; a second substrate disposed on the first substrate; and a liquid crystal layer interposed between the first and second substrates, each of the sub-pixel electrodes includes a stem electrode, an outer electrode connected to the stem electrode, a first branch electrode extending from the stem electrode or the outer electrode in a first direction, and a second branch electrode extending from the stem electrode or the outer electrode in a second direction, wherein an angle between the first direction and the second direction is in a range of about 170 to about 180 degrees.

19 Claims, 8 Drawing Sheets

(56) References Cited

U.S. PATENT DOCUMENTS

2014/0078458 A1* 3/2014 Fukushima ....... G02F 1/133305
                                                    349/158
2014/0104547 A1* 4/2014 Kuo ................. G02F 1/133707
                                                    349/106
2014/0327852 A1* 11/2014 Chung ............. G02F 1/133707
                                                    349/43

FOREIGN PATENT DOCUMENTS

KR      10-1189280 B1    7/2010
KR    10-2012-0126223 A  11/2012

* cited by examiner

DISPLAY DEVICE

CLAIM OF PRIORITY

This application claims the priority of and all the benefits accruing under 35 U.S.C. § 119 of Korean Patent Application No. 10-2015-0013654, filed on Jan. 28, 2015 with the Korean Intellectual Property Office (KIPO), the disclosure of which is incorporated herein in its entirety by reference.

BACKGROUND OF THE INVENTION

1. Field of Disclosure

Aspects of embodiments of the present invention relate to a display device, and more particularly, to a high-resolution display device with enhanced side visibility.

2. Description of the Related Art

A liquid crystal display (LCD) device is a type of flat panel display (FPD) device which has found wide recent acceptance. Such an LCD device includes two substrates having electrodes formed thereon and a liquid crystal layer interposed therebetween. Upon voltages being applied to the electrodes, liquid crystal molecules of the liquid crystal layer are rearranged, such that the amount of transmitted light is adjusted in the display device.

Among LCD devices, a vertically aligned LCD (VA-LCD) device is being developed in which liquid crystal molecules are aligned in a length direction thereof to be perpendicular to a substrate in a state in which an electric field is not applied thereto.

Due to a disadvantage of such a VA-LCD device in which a side visibility is inferior to a front visibility, there is a need for research to be conducted on various pixel structures in order to enhance a side visibility of the display device.

In particular, a multi-domain structure in which a pixel electrode disposed in a pixel area has a plurality of domains and inclination directions of liquid crystal molecules are different in respective domains is garnering attention recently.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY OF THE INVENTION

Aspects of embodiments of the present invention are directed to a high-resolution display device enhanced in a side visibility.

According to an exemplary embodiment of the present invention, a display device includes a first substrate; a pixel electrode disposed on the first substrate, including at least two sub-pixel electrodes separated from one another; a second substrate disposed on the first substrate; and a liquid crystal layer interposed between the first and second substrates, each of the sub-pixel electrodes includes a stem electrode, an outer electrode connected to the stem electrode, a first branch electrode extending from the stem electrode or the outer electrode in a first direction, and a second branch electrode extending from the stem electrode or the outer electrode in a second direction, wherein an angle between the first direction and the second direction is in a range of about 170 to about 180 degrees.

The first branch electrode extends from the stem electrode or the outer electrode in an upper left direction, and the second branch electrode extends from the stem electrode or the outer electrode in a lower right direction.

An inner angle between the first branch electrode and the stem electrode or an inner angle between the first branch electrode and the outer electrode is in a range of about 40 to about 50 degrees, and an inner angle between the second branch electrode and the stem electrode or an inner angle between the second branch electrode and the outer electrode is in a range of about 40 to about 50 degrees.

The first branch electrode extends from the stem electrode or the outer electrode in an upper right direction, and the second branch electrode extends from the stem electrode or the outer electrode in a lower left direction.

An inner angle between the first branch electrode and the stem electrode or an inner angle between the first branch electrode and the outer electrode is in a range of about 40 to about 50 degrees, and an inner angle between the second branch electrode and the stem electrode or an inner angle between the second branch electrode and the outer electrode is in a range of about 40 to about 50 degrees.

The display device may further include a first thin film transistor (TFT) connected to one of the sub-pixel electrodes; a second TFT connected to another one of the sub-pixel electrodes; a gate line connected to the first and second TFTs; a first data line disposed to intersect the gate line and connected to the first TFT; and a second data line disposed to be spaced apart from the first data line and connected to the second TFT.

The sub-pixel electrodes are disposed between the first and second data lines, and vertically divided by the gate line.

A voltage applied from the first data line to one of the sub-pixel electrodes differs from a voltage applied from the second data line to another one of the sub-pixel electrodes.

The display device may further include a light shielding portion disposed on the second substrate; a planarization layer disposed on the light shielding portion; and a common electrode disposed on the planarization layer.

The outer electrode includes an inverted L-shaped portion connected to a side of the stem electrode and an I-shaped portion connected to another side of the stem electrode. According to another exemplary embodiment of the present invention, a display device includes A first substrate; a first pixel electrode disposed on the first substrate and including at least two first sub-pixel electrodes separated from one another; a second pixel electrode disposed adjacently to the first pixel electrodes and including at least two second sub-pixel electrodes separated from one another; a second substrate disposed opposite to the first substrate; and a liquid crystal layer interposed between the first and second substrates, each of the first sub-pixel electrodes including a first stem electrode, a first outer electrode connected to the first stem electrode, a first branch electrode extending from the first stem electrode or the first outer electrode in a first direction, and a second branch electrode extending from the first stem electrode or the first outer electrode in a second direction at an angle in a range of about 170 to about 180 degrees with respect to the first direction, and each of the second sub-pixel electrodes including a second stem electrode, a second outer electrode connected to the second stem electrode, a third branch electrode extending from the second stem electrode or the second outer electrode in a third direction at an angle in a range of about 80 to about 100 degrees with respect to the first direction, and a fourth branch electrode extending from the second stem electrode or the second outer electrode in a fourth direction at an angle in a range of about 170 to about 180 degrees with respect to the third direction.

The first and second pixel electrodes are sequentially disposed in a column direction.

The first and second pixel electrodes are sequentially disposed in a row direction.

At least two first pixel electrodes and at least two second pixel electrodes are sequentially disposed in a row direction in an iterative manner.

An inner angle between the first branch electrode and the first stem electrode or an inner angle between the first branch electrode and the first outer electrode is in a range of about 40 to about 50 degrees.

An inner angle between the second branch electrode and the first stem electrode or an inner angle between the second branch electrode and the first outer electrode is in a range of about 40 to about 50 degrees.

An inner angle between the third branch electrode and the second stem electrode or an inner angle between the third branch electrode and the second outer electrode is in a range of about 40 to about 50 degrees.

An inner angle between the fourth branch electrode and the second stem electrode or an inner angle between the fourth branch electrode and the second outer electrode is in a range of about 40 to about 50 degrees.

The display device may further include a light shielding portion disposed on the second substrate; a planarization layer disposed on the light shielding portion; and a common electrode disposed on the planarization layer.

The first outer electrode includes a first inverted L-shaped portion connected to a side of the first stem electrode and a first I-shaped portion connected to another side of the first stem electrode; the second outer electrode includes a second inverted L-shaped portion connected to a side of the second stem electrode and a second I-shaped portion connected to another side of the second stem electrode.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
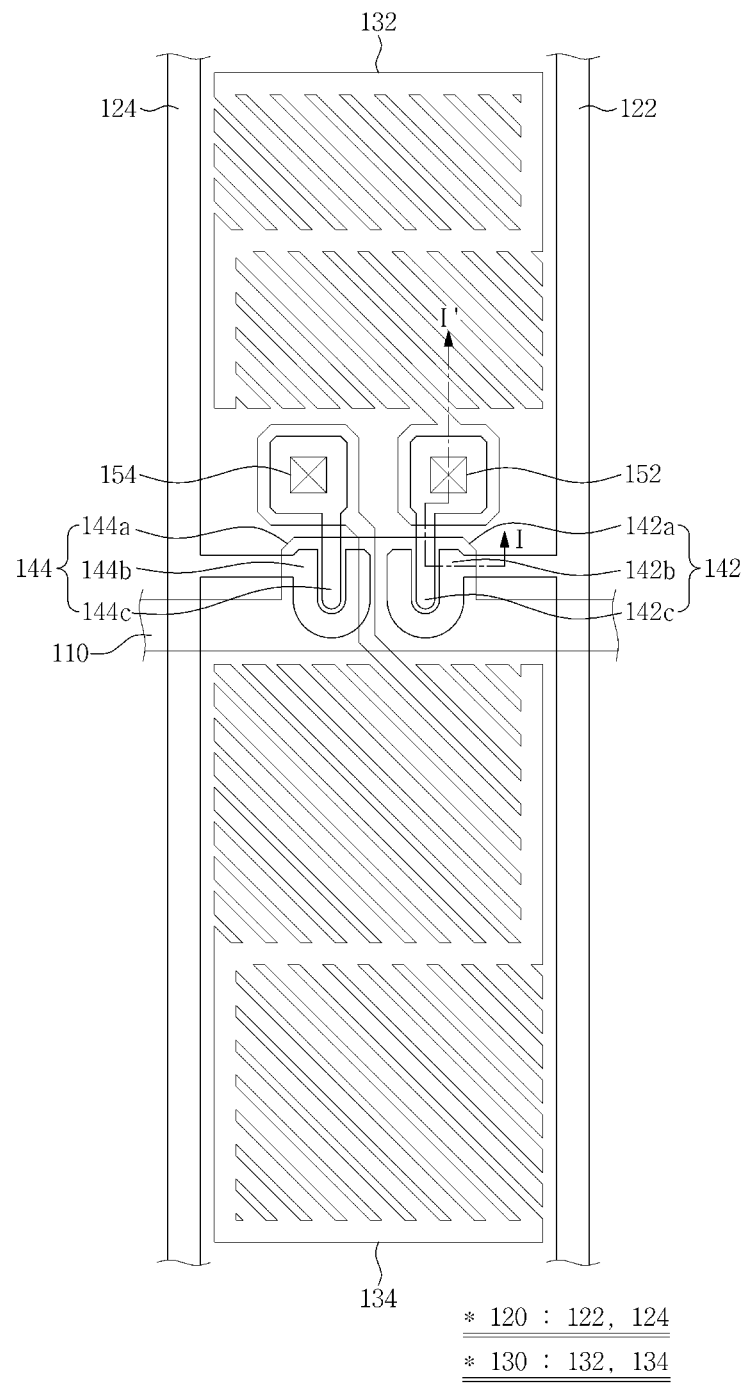
FIG. 1 is a plan view illustrating a first example of a display device according to an exemplary embodiment of the present invention.

Advantages and features of the present invention and methods for achieving them will be made clear from embodiments described below in detail with reference to the accompanying drawings. The present invention may, however, be embodied in many different forms and should not be construed as being limited to the embodiments set forth herein. Rather, these embodiments are provided so that this disclosure will be thorough and complete, and will fully convey the scope of the invention to those skilled in the art. The present invention is merely defined by the scope of the claims. Therefore, well-known constituent elements, operations and techniques are not described in detail in the embodiments in order to prevent the present invention from being obscurely interpreted. Like reference numerals refer to like elements throughout the specification.

The spatially relative terms "below", "beneath", "lower", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

All terminologies used herein are merely used to describe embodiments of the inventive concept and may be modified according to the relevant art and the intention of an applicant. Therefore, the terms used herein should be interpreted as having a meaning that is consistent with their meanings in the context of the present disclosure, and is not intended to limit the invention. As used herein, the singular forms "a", "an", and "the" are intended to include the plural forms as well, unless the context clearly indicates otherwise. It will be further understood that the terms "comprises", "comprising", "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Figure 2:
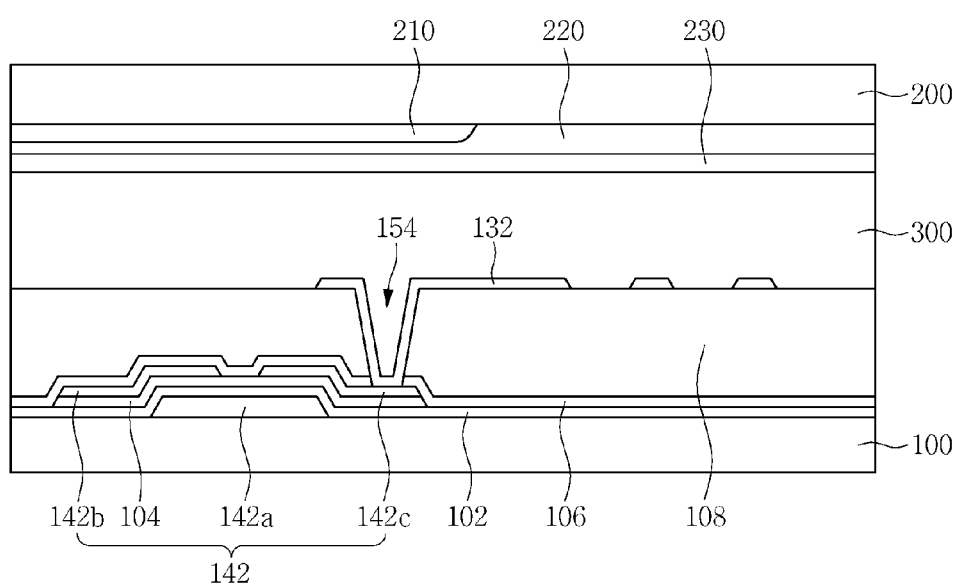
FIG. 2 is a cross-sectional view taken along line I-I' of FIG. 1.

FIG. 1 is a plan view illustrating a first example of a display device according to an exemplary embodiment of the present invention; and FIG. 2 is a cross-sectional view taken along line I-I' of FIG. 1.

Referring to FIGS. 1 and 2, a first substrate 100 may be formed of transparent glass, plastic, or the like, and may have a planar shape or a curved shape having a predetermined radius of curvature.

A gate line 110 may be disposed on the first substrate 100 in a horizontal direction. However, the disposition of the gate line 110 is not limited thereto, and the gate line 110 may be disposed on the first substrate 100 in a vertical direction.

The gate line 110 may be formed of an aluminum (Al) based metal such as Al or an Al alloy, a silver (Ag) based metal such as Ag or an Ag alloy, a copper (Cu) based metal such as Cu or a Cu alloy, a molybdenum (Mo) based metal such as Mo or a Mo alloy, chromium (Cr), tantalum (Ta), and titanium (Ti); however, the material forming the gate line 110 is not limited thereto, and the gate line 110 may have a multilayer structure including at least two conductive layers having different physical properties.

A data line 120 may be disposed in a vertical direction to intersect the gate line 110, and may be insulated from the gate line 110 by a gate insulating layer 102. However, the disposition of the data line 120 is not limited thereto, and the data line 120 may be disposed in a horizontal direction.

The data line 120 may include a first data line 122 and a second data line 124 disposed to be spaced apart from the first data line 122, and the first and second data lines 122 and 124 may transmit different voltages.

The data line 120 may be formed of a refractory metal such as Mo, Cr, Ta, and Ti or an alloy thereof; however, the material forming the data line 120 is not limited thereto, and the data line 120 may have a multilayer structure including a refractory metal layer and a low resistance conductive layer.

A pixel electrode 130 may include an upper sub-pixel electrode 132 and a lower sub-pixel electrode 134 which are separated from one another, and may be formed of a transparent conductive material. However, the material forming the pixel electrode 130 is not limited thereto, and the pixel electrode 130 may include three or more sub-pixel electrodes separated from one another.

The upper and lower sub-pixel electrodes 132 and 134 may be disposed between the first and second data lines 122 and 124, and may be disposed to be vertically separated from one another based on the gate line 110. However, the disposition of the upper and lower sub-pixel electrodes 132 and 134 is not limited thereto, and the upper and lower sub-pixel electrodes 132 and 134 may be disposed upwardly of the gate line 110 to be divided therein.

Figure 4:
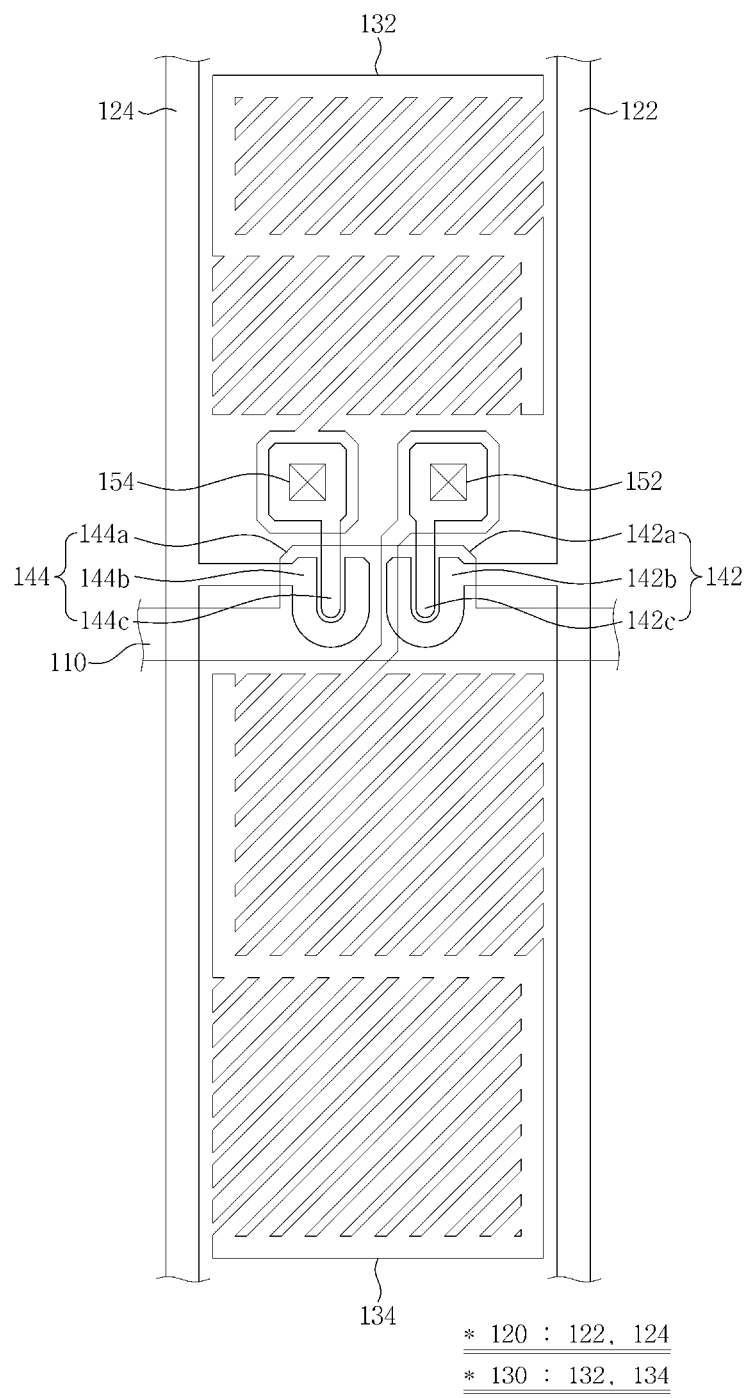
FIG. 4 is a plan view illustrating a second example of a display device according to an exemplary embodiment of the present invention.

A detailed description pertaining to the upper and lower sub-pixel electrodes 132 and 134 will be provided further with reference to FIG. 4.

A first thin film transistor (TFT) 142 may include a gate electrode 142a connected to the gate line 110, a first source electrode 142b connected to the first data line 122, and a first drain electrode 142c connected to the upper sub-pixel electrode 132 through a first contact hole 152.

A second TFT 144 may include a second gate electrode 144a connected to the gate line 110, a second source electrode 144b connected to the second data line 124, and a second drain electrode 144c connected to the lower sub-pixel electrode 134 through a second contact hole 154.

In this instance, the first and second gate electrodes 142a and 144a may be connected to the same gate line 110 while the first and second source electrodes 142b and 144b may be connected to the first and second data lines 122 and 124, respectively. Accordingly, a voltage applied to the upper sub-pixel electrode 132 may differ from a voltage applied to the lower sub-pixel electrode 134.

Since the second TFT 144 has the same configuration as that of the first TFT 142, a detailed description of the second TFT 144 will be substituted by a description of the first TFT 142.

The first gate electrode 142a may be insulated from the first source electrode 142b and the first drain electrode 142c by the gate insulating layer 102. A semiconductor layer 104 may be disposed between the gate insulating layer 102 and the first source electrode 142b and between the gate insulating layer 102 and the first drain electrode 142c.

The first gate electrode 142a may be formed of a conductive material, and may have a monolayer or multilayer structure formed using one of Mo, Al, Cr, gold (Au), Ti, nickel (Ni), neodymium (Nd), and Cu, or an alloy thereof. However, the material forming the first gate electrode 142a is not limited thereto, and the first gate electrode 142a may be formed of various conductive materials.

The gate insulating layer 102 may be disposed on the first substrate 100 to cover the first gate electrode 142a, and may serve to prevent infiltration of moisture or impure elements through the first substrate 100. The gate insulating layer 102 may be formed of an insulating material, and may have a monolayer or multilayer structure formed of silicon nitride (SiNx) or silicon oxide (SiOx). However, the material forming the gate insulating layer 102 is not limited thereto, and the gate insulating layer 102 may be formed of various insulating materials.

The semiconductor layer 104 may be formed of an oxide semiconductor. The oxide semiconductor may be a metal oxide semiconductor (MOS), and may include one or more of metals such as zinc (Zn), indium (In), gallium (Ga), tin (Sn), and titanium (Ti), and an oxide thereof. For example, the oxide semiconductor may include at least one of zinc oxide (ZnO), indium-gallium-zinc oxide (IGZO), and indium-zinc-tin oxide (IZTO). However, the material forming the semiconductor layer 104 is not limited thereto, and the semiconductor layer 104 may be formed of various materials.

The first source electrode 142b may be disposed on the semiconductor layer 104. The first source electrode 142b may be formed of a conductive material, and may have a monolayer or multilayer structure formed using one of Mo, Al, Cr, Au, Ti, Ni, Nd, and Cu, or an alloy thereof. However, the material forming the first source electrode 142b is not limited thereto, and the first source electrode 142b may be formed of various conductive materials.

The first drain electrode 142c may be disposed on the semiconductor layer 104 while being spaced apart from the first source electrode 142b. The first drain electrode 142c may be formed of a conductive material, and may have a monolayer or multilayer structure formed using one of Mo, Al, Cr, Au, Ti, Ni, Nd, and Cu, or an alloy thereof. However, the material forming the first drain electrode 142c is not limited thereto, and the first drain electrode 142c may be formed of various conductive materials.

Although not illustrated, an ohmic contact layer may further be disposed between the first source electrode 142b and the semiconductor layer 104 and between the first drain electrode 142c and the semiconductor layer 104. The ohmic contact layer (not illustrated) may be formed of a material such as silicide or amorphous silicon doped with n-type impurities at high concentration.

A protection layer 106 may be disposed to cover the first source electrode 142b and the first drain electrode 142c, and may have the first contact hole 152 through which a portion of the first drain electrode 142c is exposed. The protection layer 106 may be formed of an inorganic insulating material such as SiNx or SiOx or an organic insulating material.

A color filter 108 may be disposed on the protection layer 106. The color filter 108 may display one of basic colors, such as the three primary colors of red, green, and blue. However, the color displayed by the color filter 108 is not limited thereto, and the color filter 108 may display one of cyan, magenta, yellow, and white. In addition, the disposition of the color filter 108 and the protection layer 106 is not limited thereto, and the color filter 108 may be disposed on a second substrate 200, and an organic layer formed of an organic material may be disposed on the protection layer 106.

Although not illustrated, a capping layer may be disposed on the color filter 108. The capping layer (not illustrated) may serve to prevent contaminants generated from the color filter 108 from flowing into a liquid crystal layer 300. The capping layer (not illustrated) may be formed of an inorganic material such as SiNx, SiOx, or silicon oxycarbide (SiOC) or an organic material.

The second substrate 200 may be disposed opposite to the first substrate 100, and may be formed of transparent glass, plastic, or the like. The second substrate 200 may have a planar shape or a curved shape having a radius of curvature less than that of the first substrate 100.

A light shielding portion 210 may be disposed on the second substrate 200 to cover the gate line 110, the data line 120, the first TFT 142, and the second TFT 144. However, the disposition of the light shielding portion 210 is not limited thereto, and the light shielding portion 210 may be disposed on the first substrate 100.

The light shielding portion 210 may serve to prevent leakage of light generated in the gate line 110, the data line 120, and first TFT 142, and the second TFT 144. The light shielding portion 210 may be formed of a photosensitive organic material added with a black pigment.

A planarization layer 220 may be disposed on the light shielding portion 210, and may serve to planarize the light shielding portion 210. The planarization layer 220 may be formed of an organic material, and the like.

A common electrode 230 may be disposed on the planarization layer 220, and may be formed of a transparent conductive material.

The liquid crystal layer 300 may be interposed between the first and second substrates 100 and 200. The liquid crystal layer 300 may include a polymer material having an orientation formed by irradiating UV light polarized in a predetermined direction.

Figure 3:
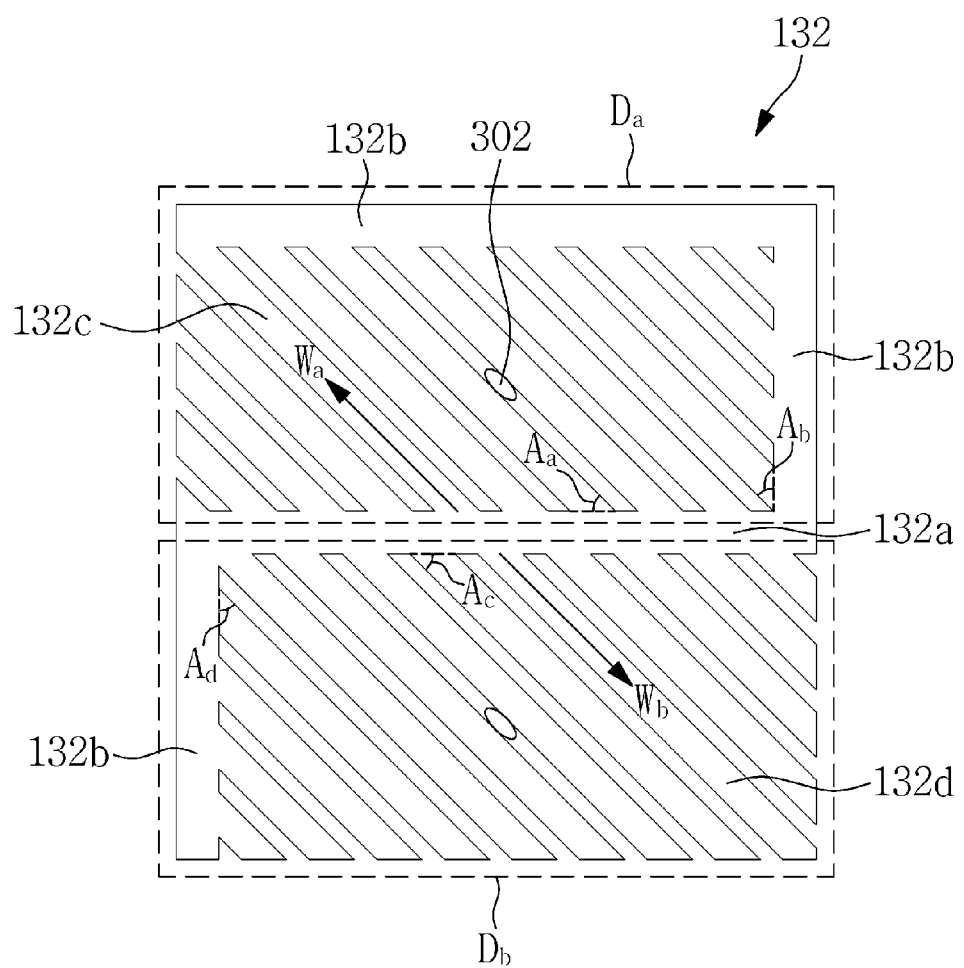
FIG. 3 is a view illustrating a basic structure of an upper sub-pixel electrode of FIG. 1.

FIG. 3 is a view illustrating a basic structure of the upper sub-pixel electrode 132 of FIG. 1.

Referring to FIG. 3, the upper sub-pixel electrode 132 may include a stem electrode 132a, an outer electrode 132b connected to the stem electrode 132a, and first and second branch electrodes 132c and 132d each extending from the stem electrode 132a or the outer electrode 132b.

The stem electrode 132a may have a linear shape extending in a horizontal direction. However, the shape of the stem electrode 132a is not limited thereto, and the stem electrode 132a may have a linear shape extending in a vertical direction. The stem electrode 132a may affect a front visibility of the display device.

The outer electrode 132b may have a shape including an inverted "L" shape connected to a right end of the stem electrode 132a to vertically extend in an upward direction to be bent in parallel with respect to a lengthwise direction of the stem electrode 132a and a shape including an "I" shape connected to a left end of the stem electrode 132a to vertically extend in a downward direction. However, the shape of the outer electrode 132b is not limited thereto, and the outer electrode 132b may have a shape (not shown) connected to both ends of the stem electrode 132a to vertically extend in the upward and downward directions or a quadrangular shape enclosing a circumference of the stem electrode 132a.

The first branch electrode 132c may extend from the stem electrode 132a or the outer electrode 132b in a first direction, and the second branch electrode 132d may extend from the stem electrode 132a or the outer electrode 132b in a second direction at an angle in a range of about 170 to about 180 degrees with respect to the first direction. The first and second branch electrodes 132c and 132d may affect a side visibility of the display device.

In detail, the first branch electrode 132c may extend from the stem electrode 132a or the outer electrode 132b in an upper left direction Wa, and the second branch electrode 132d may extend from the stem electrode 132a or the outer electrode 132b in a lower right direction Wb. Sides of the first and second branch electrodes 132c and 132d extending in the upper left direction Wa and the lower right direction Wb, respectively, may distort an electric field to form horizontal components of the electric field determining an inclination direction of a liquid crystal molecule 302. The horizontal components of the electric field may be formed to be substantially parallel with respect to the sides of the first and second branch electrodes 132c and 132d. Accordingly, the liquid crystal molecules 302 may be aligned in two different directions in two domains Da and Db of the upper sub-pixel electrode 132, respectively.

In this instance, an inner angle Aa between the first branch electrode 132c and the stem electrode 132a or an inner angle Ab between the first branch electrode 132c and the outer electrode 132b may be, in particular, in a range of about 40 to about 50 degrees in order to enhance transmissivity. Similarly, an inner angle Ac between the second branch electrode 132d and the stem electrode 132a or an inner angle Ad between the second branch electrode 132d and the outer electrode 132b may be, in particular, in a range of about 40 to about 50 degrees in order to enhance transmissivity.

Since the lower sub-pixel electrode 134 has the same configuration as that of the upper sub-pixel electrode 132, aside from a size thereof, with reference to FIG. 1, a detailed description pertaining to the lower sub-pixel electrode 134 will be omitted for conciseness.

A pixel electrode of a conventional display device includes a cross-shaped stem electrode and branch electrodes extending from the cross-shaped stem electrode in four different directions, respectively. A single pixel electrode may have four domains.

In general, in a case in which a size of a pixel electrode is reduced to achieve a high-resolution display device, despite the reduced size of the pixel electrode, a width of a branch electrode is not reduced due to limitations of a process, and thus a side visibility of the display device is degraded.

The display device according to the present exemplary embodiment may enhance a side visibility of a high-resolution display device by including the pixel electrode in which an area of the branch electrode forming the two domains is expanded.

Figure 5:
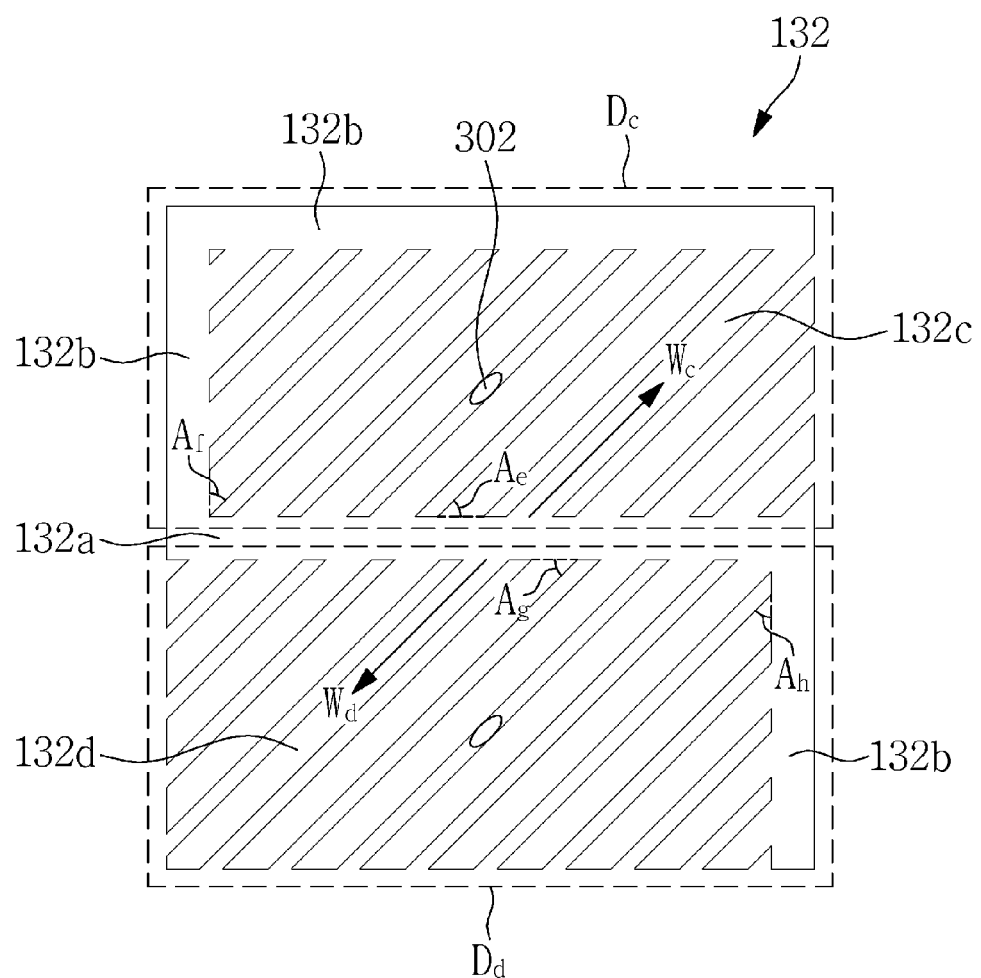
FIG. 5 is a view illustrating a basic structure of an upper sub-pixel electrode of FIG. 4.

FIG. 4 is a plan view illustrating a second example of a display device according to an exemplary embodiment of the present invention; and FIG. 5 is a view illustrating a basic structure of an upper sub-pixel electrode of FIG. 4.

Referring to FIG. 4, since the display device of FIG. 4 has the same configuration as that of the display device of FIG. 1, aside from a shape of an outer electrode 132b of upper and lower sub-pixel electrodes 132 and 134, a first branch electrode 132c, and a second branch electrode 132d, a detailed description pertaining thereto will be omitted for conciseness.

Referring to FIG. 5, the outer electrode 132b may have a shape connected to a left end of a stem electrode 132a to vertically extend in an upward direction to be bent in parallel with respect to the stem electrode 132a and a shape connected to a right end of the stem electrode 132a to vertically extend in a downward direction. However, the shape of the outer electrode 132b is not limited thereto, and the outer electrode 132b may have a shape connected to both ends of the stem electrode 132a to vertically extend in the upward and downward directions or a quadrangular shape enclosing a circumference of the stem electrode 132a.

The first branch electrode 132c may extend from the stem electrode 132a or the outer electrode 132b in an upper right direction Wc, and the second branch electrode 132d may extend from the stem electrode 132a or the outer electrode 132b in a lower left direction Wd. Sides of the first and second branch electrodes 132c and 132d extending in the upper right direction Wc and the lower left direction Wd, respectively, may distort an electric field to form horizontal components of the electric field determining an inclination direction of a liquid crystal molecule 302. The horizontal components of the electric field may be formed to be substantially parallel with respect to the sides of the first and second branch electrodes 132c and 132d. Accordingly, the liquid crystal molecules 302 may be aligned in two different directions in two domains Dc and Dd of the upper sub-pixel electrode 132, respectively.

In this instance, an inner angle Ae between the first branch electrode 132c and the stem electrode 132a or an inner angle Af between the first branch electrode 132c and the outer electrode 132b may be, in particular, in a range of about 40 to about 50 degrees in order to enhance transmissivity. Similarly, an inner angle Ag between the second branch electrode 132d and the stem electrode 132a or an inner angle Ah between the second branch electrode 132d and the outer electrode 132b may be, in particular, in a range of about 40 to about 50 degrees in order to enhance transmissivity.

Since the lower sub-pixel electrode 134 has the same configuration as that of the upper sub-pixel electrode 132, aside from a size thereof, with reference to FIG. 4, a detailed description pertaining to the lower sub-pixel electrode 134 will be omitted for conciseness.

Figure 6:
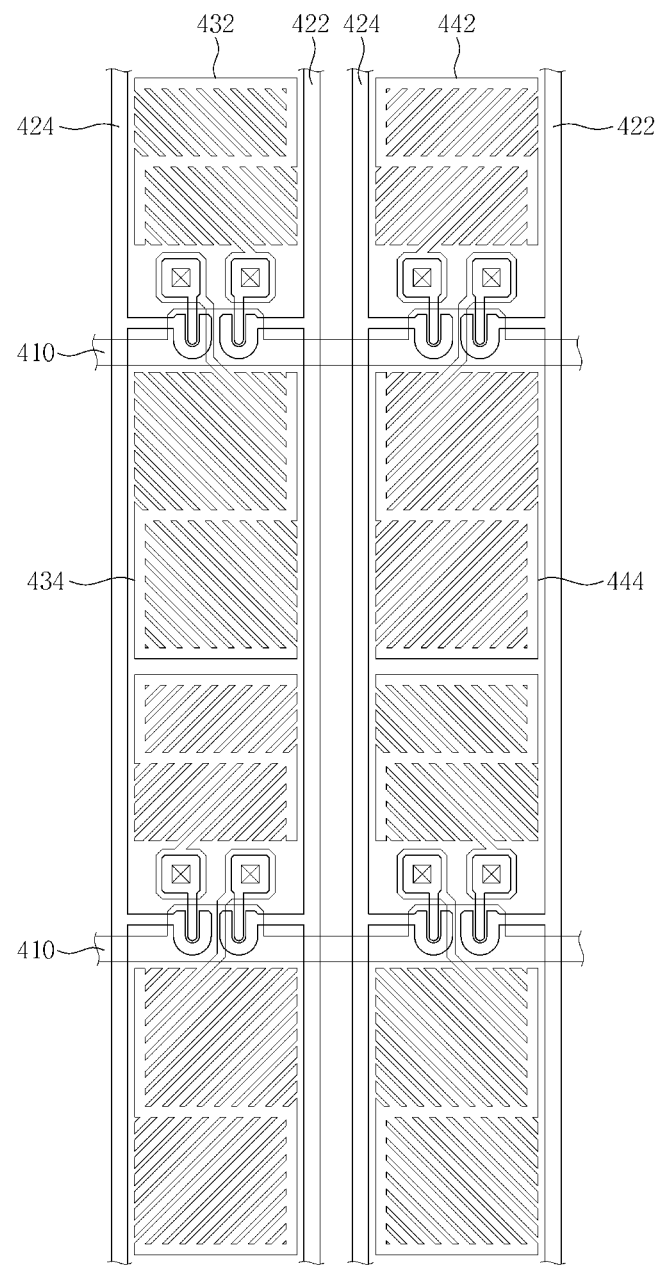
FIG. 6 is a plan view illustrating a first example of a display device according to another exemplary embodiment of the present invention.
Figure 7:
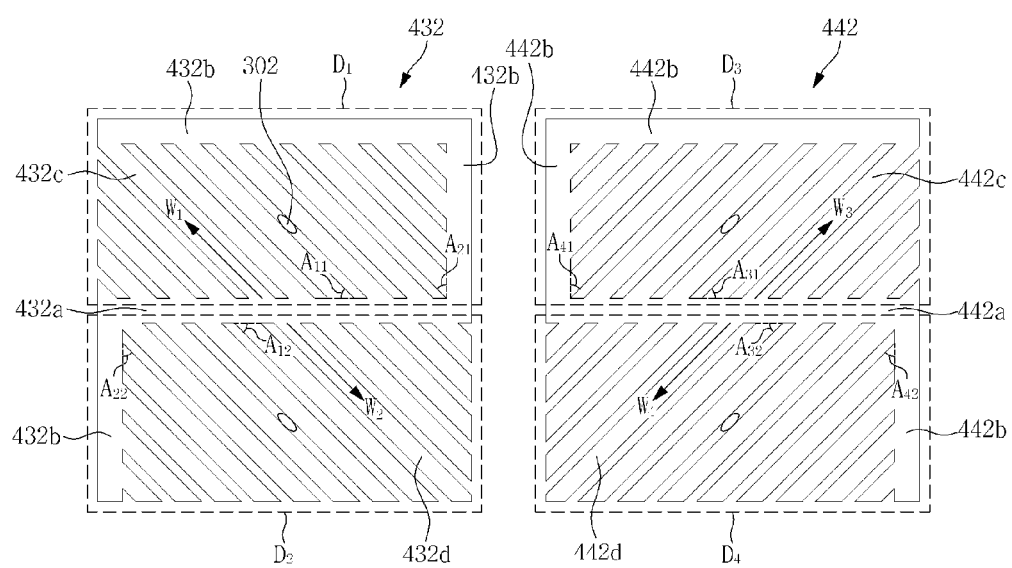
FIG. 7 is a view illustrating a basic structure of a first upper sub-pixel electrode and a second upper sub-pixel electrode of FIG. 6.

FIG. 6 is a plan view illustrating a first example of a display device according to another exemplary embodiment of the present invention; and FIG. 7 is a view illustrating a basic structure of a first upper sub-pixel electrode and a second upper sub-pixel electrode of FIG. 6.

Referring to FIG. 6, since the display device of FIG. 6 has the same configuration as that of the display devices of FIGS. 1 and 4, aside from a first pixel electrode 430 and a second pixel electrode 440, a detailed description pertaining thereto will be omitted for conciseness.

The first pixel electrode 430 may include a first upper sub-pixel electrode 432 and a first lower sub-pixel electrode 434 which are separated from one another, and the second pixel electrode 440 may include a second upper sub-pixel electrode 442 and a second lower sub-pixel electrode 444 which are separated from one another.

Referring to FIG. 7, the first upper sub-pixel electrode 432 may include a first stem electrode 432a, a first outer electrode 432b connected to the first stem electrode 432a, and first and second branch electrodes 432c and 432d each extending from the first stem electrode 432a or the first outer electrode 432b. Since the first stem electrode 432a and the first outer electrode 432b have the same configuration as that of the stem electrode 132a and the outer electrode 132b of FIG. 3, a detailed description pertaining thereto will be omitted for conciseness.

The first branch electrode 432c may extend from the first stem electrode 432a or the first outer electrode 432b in a first direction W1, and the second branch electrode 432d may extend from the first stem electrode 432a or the first outer electrode 432b in a second direction W2 at an angle in a range of about 170 to about 180 with respect to the first direction W1.

In this instance, an inner angle A11 between the first branch electrode 432c and the first stem electrode 432a and an inner angle A12 between the second branch electrode 432d and the first stem electrode 432a may be, in particular, in a range of about 40 to about 50 degrees, or an inner angle A21 between the first branch electrode 432c and the first outer electrode 432b and an inner angle A22 between the second branch electrode 432d and the first outer electrode 432b may be, in particular, in a range of about 40 to about 50 degrees, in order to enhance transmissivity.

The second upper sub-pixel electrode 442 may include a second stem electrode 442a, a second outer electrode 442b connected to the second stem electrode 442a, and third and fourth branch electrodes 442c and 442d each extending from the second stem electrode 442a or the second outer electrode 442b. Since the second stem electrode 442a and the second outer electrode 442b have the same configuration as that of the stem electrode 132a and the outer electrode 132b of FIG. 5, a detailed description pertaining thereto will be omitted for conciseness.

The third branch electrode 442c may extend from the second stem electrode 442a or the second outer electrode 442b in a third direction W3 at an angle in a range of about 80 to about 100 with respect to the first direction W1, and the fourth branch electrode 442d may extend from the second stem electrode 442a or the second outer electrode 442b in a fourth direction W4 at an angle in a range of about 170 to about 180 with respect to the third direction W3.

In this instance, an inner angle A31 between the third branch electrode 442c and the second stem electrode 442a and an inner angle A32 between the fourth branch electrode 442d and the second stem electrode 442a may be, in particular, in a range of about 40 to about 50 degrees, or an inner angle A41 between the third branch electrode 442c and the second outer electrode 442b and an inner angle A42 between the fourth branch electrode 442d and the second outer electrode 442b may be, in particular, in a range of about 40 to about 50 degrees, in order to enhance transmissivity.

The first upper sub-pixel electrode 432 may have two domains D1 and D2, and the second upper sub-pixel electrode 442 may have two domains D3 and D4 different from those of the first upper sub-pixel electrode 432. Accordingly, the liquid crystal molecules 302 may be aligned in four different directions in the four domains D1, D2, D3, and D4 of the first upper sub-pixel electrode 432 and the second upper sub-pixel electrode 442.

The first and second pixel electrodes 430 and 440 may be sequentially disposed in row and column directions with reference to FIG. 6. Accordingly, the first and second pixel electrodes 430 and 440 adjacently disposed in the row and column directions may further enhance a side visibility of a high-resolution display device by forming the four domains.

Figure 8:
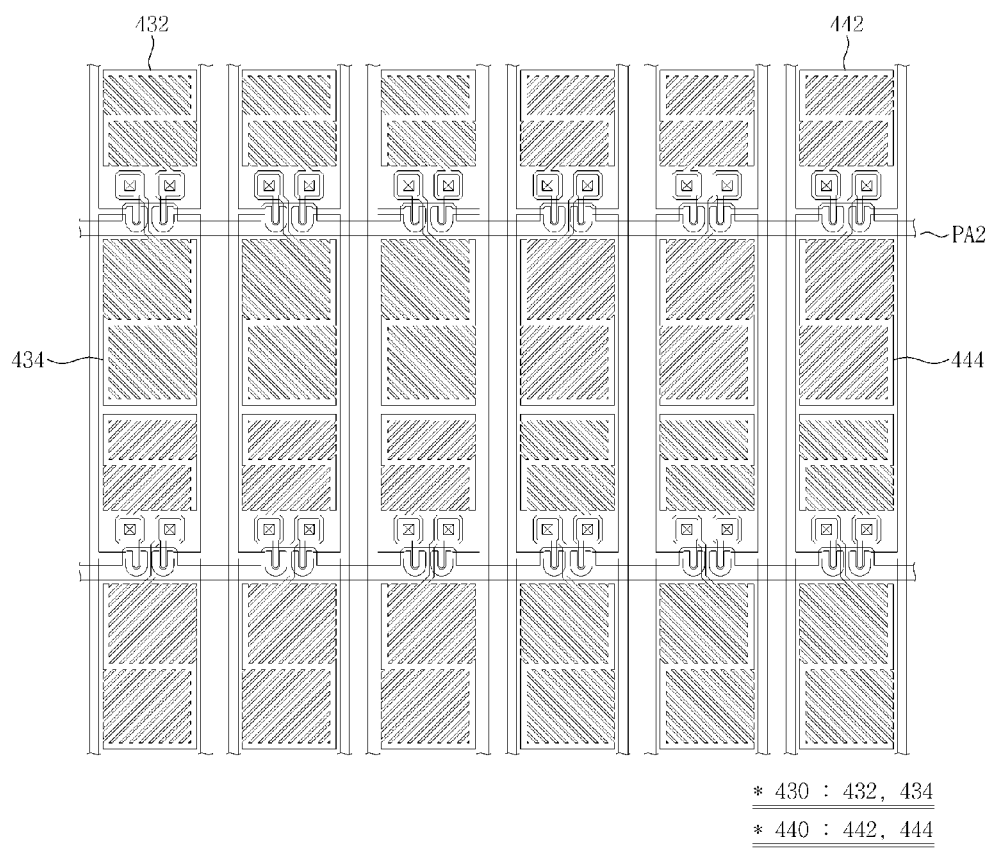
FIG. 8 is a plan view illustrating a second example of a display device according to another exemplary embodiment of the present invention.

FIG. 8 is a plan view illustrating a second example of a display device according to another exemplary embodiment of the present invention.

Referring to FIG. 8, since the display device of FIG. 8 has the same configuration as that of the display device of FIG. 6, aside from a disposition of the first pixel electrode 430 and the second pixel electrode 440, a detailed description pertaining thereto will be omitted for conciseness.

The first and second pixel electrodes 430 and 440 may be sequentially disposed in a column direction, and three first pixel electrodes 430 and three second pixel electrodes 440 may be sequentially disposed in a row direction in an iterative manner. However, the disposition of the first and second pixel electrodes 430 and 440 is not limited thereto, and two first pixel electrodes 430 and two second pixel electrodes 440 may be sequentially disposed in a row direction in an iterative manner.

That is, the three first pixel electrodes 430 and the three second pixel electrodes 440 may form a first pixel group and a second pixel group, respectively, and the first pixel group and the second pixel group may be sequentially disposed in the row and column directions.

As set forth above, according to exemplary embodiments, the display device may enhance a side visibility of a high-resolution display device having a relatively small pixel area, due to the pixel electrode having the branch electrode with an expanded area.

In addition, the display device may further enhance a side visibility of a high-resolution display device by adjacently disposing the pixel electrodes each having two different domains to thereby form four domains.

From the foregoing, it will be appreciated that various embodiments in accordance with the present disclosure have been described herein for purposes of illustration, and that various modifications may be made without departing from the scope and spirit of the present teachings. Accordingly, the various embodiments disclosed herein are not intended to be limiting of the true scope and spirit of the present teachings. Various features of the above described and other embodiments can be mixed and matched in any manner, to produce further embodiments consistent with the invention.

What is claimed is:

1. A display device comprising:
a first substrate;
a pixel electrode disposed on the first substrate, including at least two sub-pixel electrodes separated from one another;
a second substrate disposed on the first substrate; and
a liquid crystal layer interposed between the first and second substrates,
wherein each of the sub-pixel electrodes includes:
only a single stem electrode,
an outer electrode connected to the stem electrode,
a first branch electrode extending from the stem electrode or the outer electrode in a first direction, and
a second branch electrode extending from the stem electrode or the outer electrode in a second direction,
wherein an angle between the first direction and the second direction is greater than or equal to 170 degrees and less than 180 degrees, and
wherein the outer electrode includes an inverted L-shaped portion connected to a side of the stem electrode and an I-shaped portion connected to another side of the stem electrode, and wherein a structure including the inverted L-shaped portion and the stem electrode has a shape of "[" or "]".

2. The display device of claim 1, wherein the first branch electrode extends from the stem electrode or the outer electrode in an upper left direction, and
the second branch electrode extends from the stem electrode or the outer electrode in a lower right direction.

3. The display device of claim 2, wherein an inner angle between the first branch electrode and the stem electrode or an inner angle between the first branch electrode and the outer electrode is in a range of about 40 to about 50 degrees, and
an inner angle between the second branch electrode and the stem electrode or an inner angle between the second branch electrode and the outer electrode is in a range of about 40 to about 50 degrees.

4. The display device of claim 1, wherein the first branch electrode extends from the stem electrode or the outer electrode in an upper right direction, and
the second branch electrode extends from the stem electrode or the outer electrode in a lower left direction.

5. The display device of claim 4, wherein an inner angle between the first branch electrode and the stem electrode or an inner angle between the first branch electrode and the outer electrode is in a range of about 40 to about 50 degrees, and
an inner angle between the second branch electrode and the stem electrode or an inner angle between the second branch electrode and the outer electrode is in a range of about 40 to about 50 degrees.

6. The display device of claim 1, further comprising:
a first thin film transistor (TFT) connected to one of the sub-pixel electrodes;
a second TFT connected to another one of the sub-pixel electrodes;
a gate line connected to the first and second TFTs;
a first data line disposed to intersect the gate line and connected to the first TFT; and
a second data line disposed to be spaced apart from the first data line and connected to the second TFT.

7. The display device of claim 6, wherein the sub-pixel electrodes are disposed between the first and second data lines, and vertically divided by the gate line.

8. The display device of claim 6, wherein a voltage applied from the first data line to one of the sub-pixel electrodes differs from a voltage applied from the second data line to another one of the sub-pixel electrodes.

9. The display device of claim 1, further comprising:
a light shielding portion disposed on the second substrate;
a planarization layer disposed on the light shielding portion; and
a common electrode disposed on the planarization layer.

10. A display device comprising:
a first substrate;
a first pixel electrode disposed on the first substrate and including at least two first sub-pixel electrodes separated from one another;
a second pixel electrode disposed adjacently to the first pixel electrodes and including at least two second sub-pixel electrodes separated from one another;
a second substrate disposed opposite to the first substrate; and
a liquid crystal layer interposed between the first and second substrates,
wherein each of the first sub-pixel electrodes includes:
only a single first stem electrode, a first outer electrode connected to the first stem electrode, a first branch electrode extending from the first stem electrode or the first outer electrode in a first direction, and a second branch electrode extending from the first stem electrode or the first outer electrode in a second direction at an angle greater than or equal to 170 degrees and less than 180 degrees with respect to the first direction, wherein each of the second sub-pixel electrodes includes:

a second stem electrode, a second outer electrode connected to the second stem electrode, a third branch electrode extending from the second stem electrode or the second outer electrode in a third direction at an angle in a range of about 80 to about 100 degrees with respect to the first direction, and a fourth branch electrode extending from the second stem electrode or the second outer electrode in a fourth direction at an angle greater than or equal to 170 degrees and less than 180 degrees with respect to the third direction, wherein the first outer electrode includes a first inverted L-shaped portion connected to a side of the first stem electrode and a first I-shaped portion connected to another side of the first stem electrode, and wherein a first structure including the first inverted L-shaped portion and the first stem electrode has a shape of "]".

11. The display device of claim 10, wherein the first and second pixel electrodes are sequentially disposed in a column direction.

12. The display device of claim 11, wherein the first and second pixel electrodes are sequentially disposed in a row direction.

13. The display device of claim 11, wherein at least two first pixel electrodes and at least two second pixel electrodes are sequentially disposed in a row direction in an iterative manner.

14. The display device of claim 10, wherein an inner angle between the first branch electrode and the first stem electrode or an inner angle between the first branch electrode and the first outer electrode is in a range of about 40 to about 50 degrees.

15. The display device of claim 10, wherein an inner angle between the second branch electrode and the first stem electrode or an inner angle between the second branch electrode and the first outer electrode is in a range of about 40 to about 50 degrees.

16. The display device of claim 10, wherein an inner angle between the third branch electrode and the second stem electrode or an inner angle between the third branch electrode and the second outer electrode is in a range of about 40 to about 50 degrees.

17. The display device of claim 10, wherein an inner angle between the fourth branch electrode and the second stem electrode or an inner angle between the fourth branch electrode and the second outer electrode is in a range of about 40 to about 50 degrees.

18. The display device of claim 10, further comprising:

a light shielding portion disposed on the second substrate;

a planarization layer disposed on the light shielding portion; and a common electrode disposed on the planarization layer.

19. The display device of claim 10, wherein:

the second outer electrode includes a second inverted L-shaped portion connected to a side of the second stem electrode and a second I-shaped portion connected to another side of the second stem electrode; and a second structure including the second inverted L-shaped portion and the second stem electrode has a shape of "[".

* * * * *